(No Model.)
O. LAHRMANN.
PROCESS OF PREPARING SUBSTITUTES FOR MOTHER'S MILK.
No. 268,245. Patented Nov. 28, 1882.
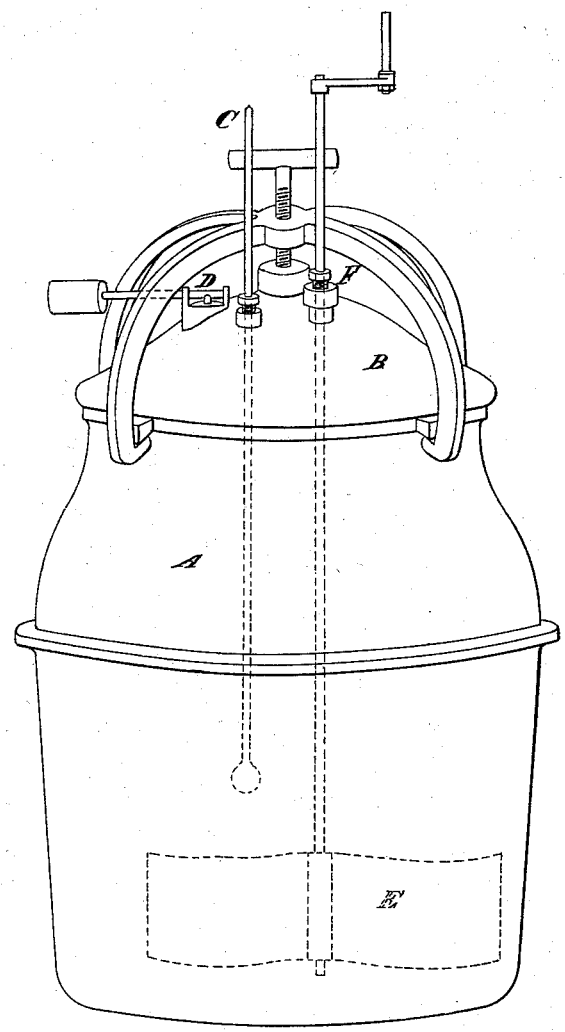
Witnesses:
Fred Haynes
John Becker
Inventor:
Otto Lahrmann
by his A. Homeyer
Brown & Brown

UNITED STATES PATENT OFFICE.

OTTO LAHRMANN, OF ALTONA, GERMANY.

PROCESS OF PREPARING SUBSTITUTES FOR MOTHERS' MILK.

SPECIFICATION forming part of Letters Patent No. 268,245, dated November 28, 1882.

Application filed October 17, 1882. (No specimens.)

*To all whom it may concern:*

Be it known that I, Dr. OTTO LAHRMANN, of Altona, in the Empire of Germany, have invented a new and Improved Process of Producing Imitation Human Milk, of which the following is a specification, reference being had to the accompanying drawing, which represents in perspective the apparatus in which my process may be performed, and in which—

A designates a glass vessel fitted with a removable tight cover, B, and fitted with a thermometer, C, a safety-valve, D, and a stirrer, E, the shaft of which works through a stuffing-box, F.

A large proportion of the infants which are born being now reared by hand, my object is to supply a recognized want by producing by artificial means a substitute for human milk which shall closely resemble it in respect of its nutritive constituents, both qualitatively and quantitatively, and thereby to avoid the danger now attending the use of the milk of the cow or other domestic animals, by reason of the difficulty of its assimilation by infants, and, further, that of the possible conveyance of infectious diseases, either by the use of human milk or of that of domestic animals.

My process is as follows: Fresh milk from the cow or other domestic animal is freed from mechanical impurities by filtration or otherwise. It is then placed in the vessel A, placed in a bath of calcium chloride, and heated to 212° Fahrenheit. The amount of albuminoids or proteids, fatty, matter, sugar, and salts contained in the milk under treatment having been ascertained by analysis of a small portion, such an addition is made of distilled water, cream, and sugar as will bring the proportion of these constituents into correspondence with those of an average sample of human milk, due allowance being made for a certain quantity of water, which is introduced in the processes hereinafter described. The necessary addition of salts is made in a subsequent stage of the process, as also hereinafter described. The contents of the vessel are now cooled down to 86° to 104° Fahrenheit, a quantity of potassium carbonate equal to one-half to one and one-half per one thousand parts of the weight of the mixture under treatment is now added, together with a small quantity of a solution of pancreas or other digestive ferment—such, for instance, as pepsin or a vegetable ferment, such as is contained in carica papaya. The mixture is now kept in constant agitation at a temperature of from 86° to 104° Fahrenheit for from sixty to seventy minutes, and the progress of the action of the ferment is from time to time ascertained by the examination of small samples of the mixture by taste and by precipitation by sulphuric ether, dilute acids, or by other tests. When the amount of albuminoids or proteids has been reduced to that which has been ascertained to exist in the sample of human milk which it is proposed to imitate the process is at once arrested by again raising the mixture to its boiling-point by immersion in a bath of calcium chloride. While the mixture is being thus heated up to boiling-point a quantity of a one per cent. aqueous solution of glacial phosphoric acid is added, not quite sufficient to neutralize the potassium carbonate or bicarbonate previously added. The vessel being now immediately hermetically closed, the free carbonic-acid gas is liberated by the decomposition of the carbonate and is confined in the space at the top of the vessel. The temperature of the bath is now raised, so that the contents of the vessel are maintained at from 215° to 220° Fahrenheit for one hour, or more, by which means any organisms capable of producing disease, if such happened to exist in the mixture, would be effectually destroyed. The artificial human milk, which is now ready for use, is drawn off, while brisk agitation is maintained, by a siphon or by other convenient means, (the above-named temperature being still maintained) into bottles, which, together with the corks, are kept by a suitable arrangement at the same heat during the whole process of filling and corking, and is now ready for sale. As the composition of human milk is subject to a well-ascertained variation, according to the period of lactation at which it is secreted, three or more qualities of artificial human milk may be made, in which the amounts of the nutritive constituents shall be graduated in a manner corresponding with the periods of lactation. As the composition of the milk of cows, as well as that of human milk, varies, no exact formula can be given which will be applicable to all cases. I will, however, give such particulars as will suffice for converting cow's milk of average quality into three different qualities of artificial human milk; but in practice of the said invention it is necessary to make a rough analysis of the milk operated upon, in order to determine the necessary modifications in the proportions of the added materials, which must be made where exact results are required. For ordinary purposes the following particulars will suffice: I take cow's milk having the following or nearly the following composition: 89.4 parts of water, 3.5 parts of nitrogenous substances, 2.5 parts fatty matter, four parts sugar, and six parts ash or mineral matter. I will call this milk to be operated upon the "normal milk." In practice I find it convenient to produce three qualities of artificial human milk. In order to produce these I form two qualities by the methods hereinafter described, and by mixing these two qualities in equal proportions a third of medium quality may be produced. By mixing them in other proportions other qualities may be produced when it is thought desirable. In order to produce artificial human milk of the quality of which I will call "No. 1" I take one thousand parts, by weight, of normal cow's milk, one thousand parts distilled water, ninety parts sugar, fifty parts cream, (containing fifty per cent. fatty matter,) three parts carbonate of potash, three parts pancreatic ferment, and eighty parts of one per cent. solution of phosphoric acid. This mixture being treated in the manner hereinbefore described produces the quality No. 1. In order to produce artificial human milk of the quality I call "No. 3" I take one thousand parts normal milk, one hundred parts distilled water, 31.5 parts sugar, five parts cream, three parts carbonate of potash, three parts pancreatic ferment, eighty parts of one per cent. phosphoric acid. By treating this mixture in the manner hereinbefore described the quality I call "No. 3" is produced. The intermediate quality, which I call "No. 2," is made by mixing of equal quantities of Nos. 1 and 3.

In addition to the particulars hereinbefore given with respect to the conducting of the process described, I remark that the action of the pancreatic ferment may be ascertained from time to time in various ways: first by taste, a very slight bitter taste being observed when the action has reached the desired degree; secondly, by precipitation of one part of the milk by the addition of a mixture of ten parts of ether alcohol and a comparison of the amount of the precipitation produced in like manner by a sample of human milk of the period of lactation which it is wished to imitate; thirdly, by any of the methods of analysis—such, for instance, as precipitation by dilute acids practiced by analytical chemists.

Although I have only described the said invention as applied to the treatment of cow's milk, I wish it to be understood that the said treatment may also be applied to the milk of other domestic animals, the milk of which is or may be used as food.

In this process the action of the digestive ferment is that of converting the excess of albuminoid or proteid matter in the normal milk into peptones or peptone-like compounds, such action being promoted by the gentle heat to which the mixture is subjected, after the introduction of the ferment, until the required reduction of the albuminoid or proteid matter has been effected.

What I claim as my invention is—

The process hereinbefore described for producing from the milk of cows or other domestic animals milk having the properties of human milk—that is to say, by treating the cow's or other milk by the addition thereto of the following materials, namely: water, sugar, cream, carbonate of potash, phosphoric acid, and a digestive ferment.

OTTO LAHRMANN.

Witnesses:
F. ENGEL,
F. CLAIRMONT.